United States Patent
Kobashikawa et al.

(10) Patent No.: US 7,023,104 B2
(45) Date of Patent: Apr. 4, 2006

(54) WAVE ENERGY CONVERSION DEVICE FOR DESALINATION, ETC

(76) Inventors: Alvin Kobashikawa, 99-421 Poaha Pl., Aiea, HI (US) 96701; Yu-Si Fok, 3185 Oahu Ave., Honolulu, HI (US) 96822

( * ) Notice: Subject to any disclaimer, the term of this patent is extended or adjusted under 35 U.S.C. 154(b) by 32 days.

(21) Appl. No.: 10/618,539

(22) Filed: Jul. 9, 2003

(65) Prior Publication Data
US 2004/0007881 A1    Jan. 15, 2004

Related U.S. Application Data

(60) Provisional application No. 60/395,359, filed on Jul. 11, 2002.

(51) Int. Cl.
*F03B 13/12* (2006.01)
*F04B 35/00* (2006.01)
*B01D 61/00* (2006.01)

(52) U.S. Cl. .......................... 290/42; 290/53; 417/330; 417/334; 60/398; 416/6; 416/9

(58) Field of Classification Search ............... 290/42, 290/53; 417/330, 334; 60/398; 416/6, 9
See application file for complete search history.

(56) References Cited

U.S. PATENT DOCUMENTS

| | | | |
|---|---|---|---|
| 523,963 A | 7/1894 | Gerlach | 416/6 |
| 574,177 A | 12/1896 | Stahl | 416/6 |
| 616,468 A | 12/1898 | Jones | 417/330 |
| 647,638 A | 4/1900 | Todd | 60/605 |
| 692,396 A | 2/1902 | Wilcox | 417/330 |
| 694,242 A | 2/1902 | Borchert | 60/499 |
| 850,492 A | 4/1907 | Reynolds et al. | 417/330 |
| 908,316 A | 12/1908 | Nutt | 416/6 |
| 916,860 A | 3/1909 | Hale | 417/330 |
| 918,870 A | 4/1909 | Lawrence | 60/499 |
| 956,796 A | 5/1910 | Butler | 417/330 |
| 967,437 A | 8/1910 | Reynolds | 60/398 |
| 970,048 A | 9/1910 | Harmon | 60/413 |
| 988,508 A | 4/1911 | Reynolds | 290/4 |
| 1,032,337 A | 7/1912 | Kindleberger | 417/330 |
| 1,061,091 A | 5/1913 | Lewis | 60/506 |
| 1,072,272 A | 9/1913 | Thomas | 60/499 |

(Continued)

FOREIGN PATENT DOCUMENTS

DE    19610922 A1 *  1/1998

*Primary Examiner*—Darren Schuberg
*Assistant Examiner*—Pedro J. Cuevas
(74) *Attorney, Agent, or Firm*—Leighton K. Chong

(57) ABSTRACT

An impulse-type "wave motor" employs a seabed-mounted or supported structure mounting a wave energy absorbing panel on a hinged lever arm for reciprocation motion to obtain optimal absorption of wave energy from wave motion in the sea. For deepwater wavelengths of L, the panel is optimally positioned in a region within L/2 depth from the sea surface. The panel motion is coupled by a connecting rod to a fluid pump which generates a high-pressure fluid output that may be used to drive a reverse osmosis desalination unit or to produce other useful work. Seawater or brackish water may be desalinated through reverse osmosis membranes to produce water quality for consumption, agricultural, or other uses. The submerged operating environment of the device in a region of one-half the design wavelength provides the maximum available energy flux and forced oscillations. The pump may be of the positive-displacement piston type, plunger type, or multi-staging driver type, or a variable volume pump.

20 Claims, 7 Drawing Sheets

U.S. PATENT DOCUMENTS

| | | | | |
|---|---|---|---|---|
| 1,073,682 A | 9/1913 | Henderson | | 60/499 |
| 1,074,060 A | 9/1913 | Melander | | 417/332 |
| 1,077,509 A | 11/1913 | Bemis | | 417/330 |
| 1,096,332 A * | 5/1914 | Warden | | 416/6 |
| 1,097,073 A | 5/1914 | Bemis | | 417/330 |
| 1,439,984 A | 12/1922 | Talbert | | 417/330 |
| 1,604,632 A | 10/1926 | Carter | | 417/330 |
| 1,617,568 A | 2/1927 | Bloss | | 60/499 |
| 1,624,349 A | 4/1927 | Mann et al. | | 416/6 |
| 1,688,032 A | 10/1928 | Blair | | 60/500 |
| 1,887,316 A | 11/1932 | Lockfaw | | 417/330 |
| 2,278,818 A | 4/1942 | Zoppa | | 417/330 |
| 3,151,564 A | 10/1964 | Rosenberg | | 60/499 |
| 3,828,557 A | 8/1974 | Mochel | | 60/503 |
| 3,961,863 A * | 6/1976 | Hooper, III | | 417/334 |
| 4,002,416 A | 1/1977 | Axford | | 417/330 |
| 4,160,624 A | 7/1979 | Smith | | 417/330 |
| 4,170,738 A | 10/1979 | Smith | | 290/42 |
| 4,279,124 A | 7/1981 | Schremp | | 60/505 |
| 4,335,576 A | 6/1982 | Hopfe | | 60/398 |
| 4,340,821 A | 7/1982 | Slonin | | 290/53 |
| 4,371,788 A | 2/1983 | Smith | | 290/42 |
| 4,400,940 A | 8/1983 | Watabe | | 60/502 |
| 4,480,966 A * | 11/1984 | Smith | | 417/332 |
| 4,490,621 A | 12/1984 | Watabe | | 290/42 |
| 4,552,514 A | 11/1985 | Hagen | | 417/332 |
| 4,555,307 A | 11/1985 | Hagen | | 202/177 |
| 4,580,400 A | 4/1986 | Watabe | | 60/398 |
| 4,672,222 A | 6/1987 | Ames | | 290/53 |
| 4,781,023 A * | 11/1988 | Gordon | | 60/506 |
| 4,931,662 A * | 6/1990 | Burton | | 290/42 |
| 5,084,630 A | 1/1992 | Azimi | | 290/53 |
| 5,094,595 A | 3/1992 | Labrador | | 417/332 |
| 5,167,786 A | 12/1992 | Eberle | | 204/229 |
| 5,708,305 A * | 1/1998 | Wolfe | | 290/53 |
| 5,842,838 A | 12/1998 | Berg | | 417/331 |
| 5,975,865 A * | 11/1999 | Manabe | | 417/331 |
| 6,139,750 A * | 10/2000 | Graham | | 210/652 |
| 6,863,806 B1 * | 3/2005 | Stark et al. | | 210/170 |
| 6,948,911 B1 * | 9/2005 | Laughton | | 416/6 |

* cited by examiner

WAVE ENERGY CONVERSION DEVICE FOR DESALINATION, ETC

This U.S. patent application claims the priority of U.S. Provisional Application No. 60/395,359 of the same inventors filed on Jul. 11, 2002.

TECHNICAL FIELD

This invention generally relates to an energy conversion device powered by a renewable energy source, and more particularly, to a device that converts wave energy to supply driving pressures for desalination and other uses.

BACKGROUND OF INVENTION

In recovering wave energy from a body of water, many impulse type devices (energy absorbers) have been proposed. The general structure of an impulse type device used to capture wave energy discussed herein typically has a panel attached to a lever arm with a hinged connection to make rotation possible. Some devices have an inverted structure similar to a pendulum formed with a hinged end of the panel or lever arm, while others have the hinges in a vertical plane (a sideways pendulum). These panels are hinged to a shore-supported structure above the sea surface while the panel is extended into the wave profile. Examples of impulse-type "wave motor" devices are described in U.S. Pat. No. 918,870 to Lawrence, U.S. Pat. No. 1,073,682 to Henderson, U.S. Pat. No. 4,170,738 to Smith, and U.S. Pat. No. 4,371,788 also to Smith. However, while the prior art devices are designed to produce long traverse motion (stroke) for energy conversion, they do not produce the high pressures that might be necessary for efficient desalination and other high pressure uses.

Desalination of seawater for potable, irrigation, and other consumption uses is often required in remote regions that lack an electrical power infrastructure or where fuel supply is expensive and difficult to maintain. It is highly desirable to provide desalination of seawater powered by a renewable energy source in such locations. Some proposals have been made to use the power of waves to drive an evaporator-condenser cycle for desalination, such as disclosed in U.S. Pat. No. 4,555,307 to Hagen, or to drive an electric generator for desalination, such as disclosed in U.S. Pat. No. 4,672,222 to Ames. Another proposal has been to use wave energy to drive a DC generator which then drives a high pressure pump to desalinate seawater through reverse osmosis, such as disclosed in U.S. Pat. No. 5,167,786 to Eberle. Another proposal employs wave energy to drive a high pressure pump to produce an output steam of pressurized water which can be used in an external converter to desalinate seawater through reverse osmosis, such as disclosed in U.S. Pat. No. 5,842,838 to Berg. However, by employing successively staged energy conversion steps, these systems tend to operate at low efficiencies and have difficulty maintaining operation despite tidal variations.

SUMMARY OF INVENTION

It is therefore a principal object of the present invention to provide a wave energy conversion device that can operate at high efficiencies and maintain efficient operation despite tidal variations. In particular, it is desired to provide an impulse-type "wave motor" design that is leveraged to generate high output fluid pressures suitable for desalination by reverse osmosis and other uses.

In accordance with the present invention, a wave energy conversion device for converting wave energy from wave motion in a body of water (the sea) to a pressurized fluid output comprises:

(a) a stable platform secured to a seabed position in the sea;

(b) a lever arm having a proximal end pivotably mounted to the platform and a distal end extending in a vertical direction toward the sea surface;

(c) a wave-energy absorbing panel coupled to the distal end of the lever arm and oriented to absorb the impulse wave energy of waves moving through the sea, said panel moving in oscillating motion with the ebb and flow of wave motion; and (d) a fluid pump having a piston rod coupled to the lever arm for applying pressure to intake fluid in the pump with the oscillating motion of the panel in order to provide a high-pressure fluid output for high-pressure uses;

wherein the panel has a major part of its surface area positioned within a sea subsurface region defined as approximately a depth of L/2 below the sea surface in the vicinity of the seabed position of the device.

The described lever arm and panel configuration is made consistent with the expected waveform in the region in which the device is installed and operates for optimal energy conversion. It provides the mechanical advantage needed to produce the high working pressures for the desired work output (desalination) and to ensure that working pressures can still be produced even with smaller-than-expected wave profiles. The proportioning of the lever arm to the work surface of the panel and the length to its coupling to the pump piston rod is selected to optimize the amount of leverage desired for pressurizing the output and the expected wave profile.

The wave energy conversion device may be operable with a desalination unit employing the high-pressure fluid output from the pump to produce a desalinated water output by reverse osmosis. In a preferred embodiment, the desalination unit is supported with the pump on the platform and includes an intake filter for the intake of seawater used by the desalination unit. The desalination unit is positioned in alignment with the pump in a downstream direction of wave motion and presents no greater surface area profile to wave motion than the pump. The lever arm can be formed in different configurations. The panel may be mounted to the lever arm with a connecting rod telescoped to the pump extending at a high angle substantially vertically to a distal connection point at the back of the panel. Another version has the proximal end of the lever arm connected to a pivotable base plate which has opposing ends coupled to connecting rods of an opposing pair of pumps. Yet another version has the lever arm connected to a reciprocating cradle coupled through a pair of connecting rods for dual reciprocating action of the pumps. Still another version has two lever arms supporting the panel connected together in a reciprocating pin connected truss-type structure and coupled to multiple stages of pumps.

The pump may be a variable capacity pump with radially positioned ports along its pump bore controlled by respective valves, or may have a one-way outlet valve for releasing pressures inside the pump to vary the pump capacity. A separate one-way valve may be used to control the intake of seawater, and another one-way valve for the outflow of pressurized fluid through an outlet line.

The platform may be elevated above the seabed on pier structures, or may be made adjustable in height above the seabed. The high-pressure fluid output may be conducted to shore for use in a shore-based plant. The coupling of the panel to the lever arm may be made adjustable to adjust the position of the panel in the subsurface area despite tidal variations. The pump may have an intake for intake seawater that is buoyant or floats on the surface of the sea. Preferably, the pump is combined with the desalination unit on the platform so as to have a compact and low profile for minimizing exposure to wave action. The high pressure output of the device may also be used for producing electricity, cogeneration systems, pumping cold water from the sea depths for air-chilling systems, recirculating water to cooler depths for heat exchange uses, and pumping compressed air or other fluids.

Other objects, features, and advantages of the present invention will be explained in the following detailed description of the invention having reference to the appended drawings.

DETAILED DESCRIPTION OF INVENTION

Figure 1A:
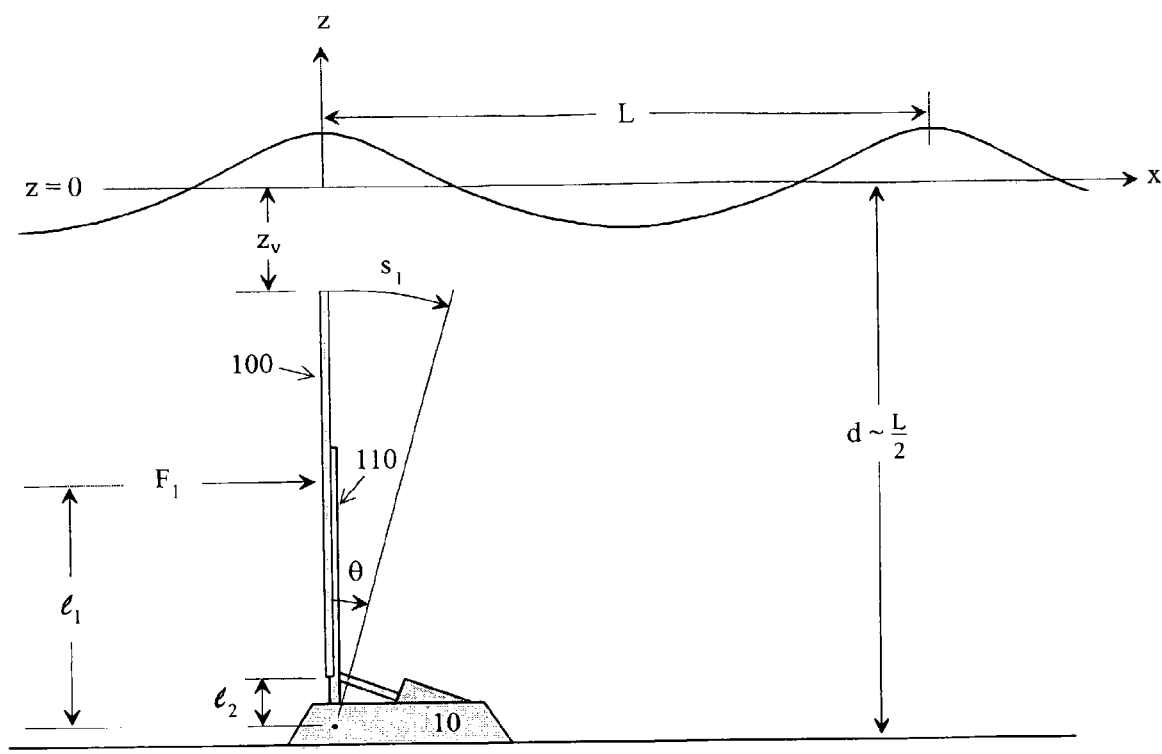
FIG. 1a is a schematic drawing illustrating the position and geometry relative to typical surface wave of a wave energy conversion device in accordance with the present invention.

Illustrative examples of a wave energy conversion device in accordance with the present invention are described in detail below. In a preferred application, the system utilizes wave energy as a source of power to drive a membrane-type reverse osmosis desalination process by either compressing seawater or brackish water. The principle of impulse-type wave energy conversion is employed to generate the required pressures to drive the reverse osmosis process. A particularly advantageous impulse-type "wave motor" structure is employed to produce efficient desalination operation. However, it is to be understood that the principles of the invention disclosed herein may be applied equivalently to other types of impulse-type wave energy conversion structures.

From wave theory, water particle movements due to wave energy flux occur within a depth of L/2, where L is the wavelength of the wave. The water depth is measured from the still water level to the seabed. The depth of water in which the wave energy propagates is greater than the height of the surface wave profile. While the wave forces are large near the surface, the total energy flux contained within the depths of the water body is greater than the amount of energy flux found within the surface wave profile. While energy can be gained from wave action alone, most of the energy propagates below the surface. The present invention recognizes the fact that more of the wave energy is available below the sea surface to a depth of approximately L/2, and that a submerged impulse device may be placed within this region stands to absorb more energy (even without optimal panel design).

From these observations, a submerged impulse-type wave energy conversion device is designed to intercept the wave energy by having the wave-energy absorbing panel pivotably mounted depthwise on a support structure supported on or elevated from the seabed and extending toward the sea surface with the projected surface area of the panel aligned parallel to the wave front where it would be in an advantageous position to collect more of the available energy. Furthermore, water particle motions due to wave motion are elliptical with larger motions occurring near the surface and diminishing in orbital motion to a depth of approximately L/2, which coincides with the region of energy propagation. Accordingly, a device with a lever arm having a pivot point in the horizontal plane located towards the seabed and an attached panel extended upward toward the sea surface within an L/2 depth from the surface would be optimally positioned according to the energy flux distribution of wave energy. Therefore, with the panel and lever arm arranged in the vertical orientation as described, the panel will have a rotational coincidence with the water particle oscillation. That is, with the panel and lever arm in the orientation previously described, the oscillating motion is similar to the distribution of the water particle movements induced by the attenuating energy. Therefore, by a design that utilizes larger elliptical water particle motion near the sea surface and decreasing orbital motion with increasing depth, a maximum of wave energy can be captured in approximately the same way that it propagates.

Most prior art "wave motor" devices are not specifically designed to operate within the full region of wave energy propagation to exploit maximum energy absorption and conversion. They do not place the wave-energy absorbing components within the optimal depth of one-half the wavelength, and they do not provide the optimal panel orientation extending toward the sea surface consistent with water particle movements. Some impulse-type devices are suspended within the water depths however, these devices tend to be inefficient since only the energy realized by the absorber is available for energy conversion and no other useful work contribution arises from the oscillation of the support structure.

A typical example of a wave energy conversion device in accordance with the present invention is illustrated schematically in FIG. 1a. The device has a panel 100 mounted on the end of a lever arm 110 hinged on a support structure 10 that is installed on the seabed of a body of water at a depth d below the still water level (z=0) of the sea surface. The panel is oriented with its primary surface area facing the expected direction of wave motion within the region. Examples of the dimensions and proportioning of the panel and lever arm components are provided based on the design average wave period $T_{ave}$, and the significant wave height $H_s$ for a particular location of interest, as well as the demand requirements. Design principles and formulas for the following examples are based on Linear Wave Theory that can be found in most coastal engineering or similar related subject texts. The references to formulas and principles presented can be found in, "Water Wave Mechanics For Engineers And Scientists", Advanced Series on Ocean Engineering-Volume 2, by Robert G. Dean and Robert A. Dalrymple, and "Hydrodynamics of Offshore Structures", by S. K. Chakrabarti. The following examples are based on ocean wave principles together with broad assumptions and approximations in an effort to provide ball-park dimensions of the components of the device. These examples are given for illustrative purposes only and are not intended to provide specific working dimensions nor is it a substitute for rigorous design procedures and calculations associated with ocean structures.

To design ocean structures it is necessary to know what conditions the device is likely to experience. These conditions are usually expressed as the design values of the average wave period ($T_{ave}$) and the significant wave height ($H_s$). If possible, these values should be obtained from actual time series data taken at the location of interest, or shoaling calculations should be made from the point of data collection to the location of interest. For this example, the average wave period and the significant wave height data were obtained from NOAA (National Oceanic and Atmospheric Administration), buoy #51003 located, 19.16 N, 160.74 W, near Hawaii. The data from this buoy was compiled from November 1984 to December 2001. During the summer seasons, the average significant wave height is shown to be about 1.5 meters to 2.5 meters (5 feet to 8 feet) and the average wave period of about 5 seconds to 7 seconds. The winter seasons show significant wave heights of 2 meters to 3.5 meters (6.5 feet to 11.5 feet), with average wave periods of 6 seconds to 9 seconds. The buoy is located in waters of approximately 16,000 feet measured from the MLL water level, (information obtained from contour map of the Hawaiian Islands, #19004, Published at Washington, D.C.).

For the first example, the summer season is chosen to obtain lower range estimates of the device using a significant wave height of 5 feet and an average wave period of 5 seconds. The design deepwater wavelength L can then be obtained from the wave period by;

$$L = gT^2/2\pi, \quad (1)$$

where, T is the is the average wave period $T_{ave}$, and g is the gravitational constant (32.2 ft/s$^2$). From equation (1) then, the deepwater wavelength L (from crest to crest) is calculated to be approximately 128 feet. Therefore the depth of operation (L/2) is, 64 feet. By the set criteria that the optimal depth of operation is within one-half of the wavelength (L/2), the deepwater condition (the depth divided by the wavelength be greater than 0.5) is automatically satisfied.

To obtain the panel width, some estimates and assumptions must first be made to setup the working parameters. The next step is to determine the available wave energy and then to establish a mathematical link between the pump variables, the leverage system, and the panel width. Therefore, based on an operational water depth of 64 feet, a 13 feet draft is assumed for light water recreational vehicles, with another 2 feet to account for tidal considerations. Estimating for a 36" diameter pump bore, and a platform thickness of 1 foot, the connecting rod pivot connection is placed at a length $l_2$ of about 4 feet above the lever arm pivot connection. If in the design of the platform it is found that this is insufficient thickness then, the difference may be added below the seabed surface. For an assumed high tide condition of 2 feet, a 13 feet draft, and 4 feet allowance at the bottom, the maximum panel height for this example is 45 feet. Further assuming the center of percussion is at the geometric center of the panel then, the lever arm length $l_1$ is calculated to be at least 26.5 feet (the distance from the lower pivot point of the lever arm to the geometric center of the panel). As shown in FIG. 1a, $z_v$ is the design allowance (13 feet draft plus 2 feet tidal buildup variation), the still water level is at z=0, and z=−d is the water depth (proportions not to scale).

To determine, how much wave energy is available to the panel, the energy density is examined within the region of L/2 (per unit surface area) which is given as;

$$E = (\tfrac{1}{8})\rho g H_s^2 \quad (2)$$

Therefore, the average energy flux for one wave period per foot of wavefront is given by;

$$E_F = C_g E. \quad (3)$$

Where $C_g$ is the group velocity given as; $C_g = (\tfrac{1}{2})[1 + \{2kd/\sin h(2kd)\}]c \quad (4)$ and, c is the dispersion relation given as; $c^2 = (g/k)\tan h(kd) \quad (5)$ Here, d is the depth, and k is given as; $k = 2\pi/L, \quad (6)$ where, L is the wavelength as given in equation (1).

To further simplify this approximation, it is assumed that one-half of the energy flux is dedicated to driving the panel (and associated components) forward, and the other half of the energy is used to return the panel. Therefore, the energy available to the panel (per foot) to drive the pump is;

$$E_{F/2} = E_F(T_{ave}/2) \quad (7)$$

The total energy available to the entire panel is then;

$$E_{F/2} P_w = E_F(T_{ave}/2) P_w \quad (8)$$

where, $P_w$ is the panel width.

Since work done is; W=F·x then, the work done on the panel can be reduced to a force ($F_1$) acting at the geometric center of the panel and can be expressed as;

$$F_1 = (E_{F/2}/s_1) P_w \quad (9)$$

Assuming that the panel moves in coincidence with the water by $s_1$ then, the horizontal particle displacement $s_1$ at the top of the panel can be calculated by;

$$s_1 = \xi = -[\{H_s \cos h(ks)\}/\{2 \sin h(kd)\}]\sin(\theta) \quad (10)$$

where, $s = z + d$ (11)

and, $\theta = (kx - \omega t)$. (12)

Where, $\omega^2 = gk \tan h(kd)$ (13)

For the assumed 36" diameter pump bore, the projected pump piston area $P_A$ is;

$$P_A = \pi r^2 \quad (14)$$

Therefore, the reaction force ($F_2$) required by the pump is represented as;

$$F_2 = p \, P_A, \quad (15)$$

where, p is the 800 psi need to drive the reverse osmosis process.

From FIG. 1a, the following relationship can be established;

$$F_1 l_1 = F_2 l_2. \quad (16)$$

Replacing the forces by substituting equation (9) and (15) into equation (16) then;

$$(E_{F/2}/S_1)P_w l_1 = p\, P_A l_2 \quad (17)$$

Solving equation (17) for $P_w$ gives, $$P_w = (l_2/l_1)(s_1/E_{F/2})p\, P_A \quad (18)$$

Solving equation (18) then, $P_w$ is found to be 23.2 feet, therefore, a minimum panel width of approximately 25 feet is required. Solving equation (10) results in a horizontal displacement $s_1$ of approximately 1.2 feet, therefore, the top of the panel is expected to oscillate about 2.5 feet.

To obtain an estimate of the expected output for this example then, assuming a constant wave period of 5 seconds and a wave height of 5 feet with constant conditions over a 24 hour period then, 17,280 pump cycles can be expected. To calculate the volume, the horizontal displacement at the connecting rod is approximated by;

$$s_2 = l_2 \theta \quad (19)$$

where, $\theta = \tan^{-1}(s_1/49\text{ ft})$, and $s_1$ is the horizontal displacement at the top of the panel given in equation (10). Therefore the volume displaced ($s_2 P_A$) by a wave height of 5 feet and a wave period of 5 seconds is approximately 5 gallons, and, over a 24-hour period the expected output is calculated to be about 89,000 gallons. It is important to note that the significant figures presented in these examples are for calculation references only and should not reflect or imply the precision of the results.

In the second example, the water depth is lowered by 2 feet to account for a low tide condition and the same calculations are carried out as outlined above using a depth of 62 feet. It should be noted that when carrying out this example, the same $s_1$ as obtained in the first example should be used. Calculations using the $s_1$ for the corresponding depth change will increase the panel width slightly (over 25 feet), however, the output at the pump will also show an increase. The resulting calculations show a panel width of 22.7 feet, which is a slight decrease as expected.

In the third example, the winter season is chosen since it is illustrative to show a range in wave height and wave period variations. Using the lower range in winter season values with a significant wave height of 6.5 feet and an average wave period of 6 seconds also includes high summer values as well. The calculation procedures are carried out as outlined in the first example using a water depth of 64 feet. From equation (1) the wavelength is found to be 184 feet. However, the device is now in intermediate waters since the d/L ratio reveals that the shallow water condition (d/L<0.05) is met but the deepwater condition is not satisfied.

Since the d/L ratio is closer to the deepwater condition (of 0.5), calculations may done using the deepwater wavelength. Other alternate methods are available to solve for the intermediate wavelength. One method may be to use, $L = T(c)^{0.5}$ where, c is solved using the Padé Approximation. Since the deepwater wavelength has already been calculated, another method is to use;

$$L = L_o[\tan h(2\pi d/L_o)]^{0.5} \quad (20)$$

where, $L_o$ is the deepwater wavelength as calculated in equation (1). From equation (20) the wavelength is calculated to be approximately 181 feet. Since the approximate panel width is known, equation (17) is solved for pressure (p) using the panel width of 25 feet. The results of the calculations show a pressure of 1,360 psi, which is a significant increase over the initial 800 psi. The calculated horizontal displacement at the top of the panel ($s_1$) turned out to be approximately 2 feet for half a wave cycle, or 4 feet of displacement for the full wave cycle.

In this section, examples were given to provide rough estimations in an attempt to describe the approximate dimensions of the device, and its working environment. In doing so, many assumptions were made and some were not mentioned in the interest of continuity of the discussion. It is instructive that some of these assumptions be made clear to gain an understanding on the scope of this device. To begin with, no shoaling calculations were made, since it was assumed that the wave conditions at the buoy were the same at the site of interest with no loss in attenuation, and no bottom currents were involved. However, bathymetry at the location of interest may also influence wave and current characteristics.

Figure 1B:
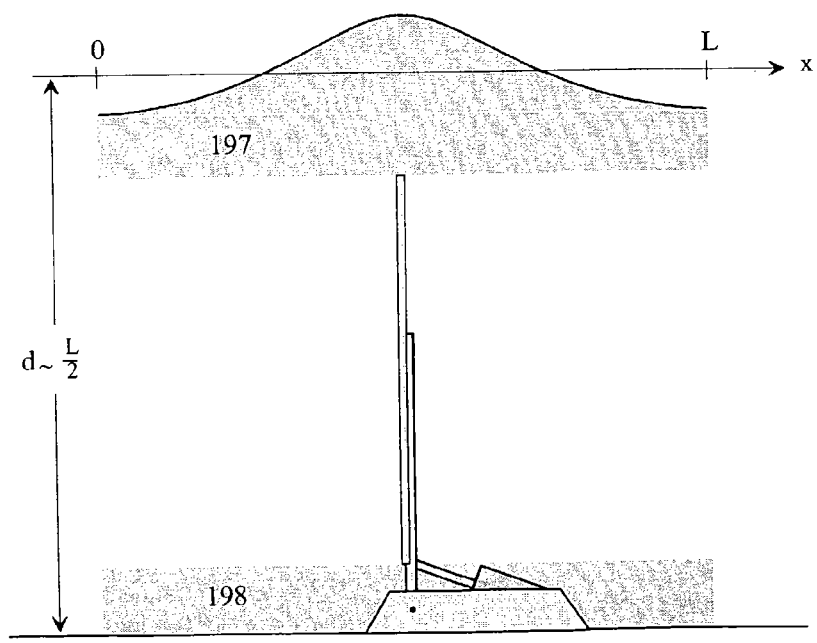
FIG. 1b shows the device relative to surface wave wavelength.

In calculating the energy flux available to the panel, it was assumed that all of the energy was transferred to the panel. The most obvious point is that the panel does not span the entire depth. As shown in FIG. 1b, the shaded regions above (197) and below (198) the panel represent the over estimated quantity of energy. In shallow water conditions, the energy flux is assumed to be linearly distributed over the depth, and a percentage of energy flux along the panel length may be estimated however, for deepwater energy distribution, this is not the case. Another important point is that the moving components (such as the panel, lever arm, etc.) and associated parts were considered massless (i.e. non-inertial), and the interacting surfaces between components were considered frictionless and therefore, these energies were not accounted for in the calculations. In reality, the panel acceleration and the wave particle acceleration are not the same. To obtain the proper lever arm (line of action) length, the mass-moment of the panel and lever arm should be calculated. For the examples, the center of percussion was assumed to be at the geometric center of the panel. In a related issue, momentum considerations of the oscillating components were also not accounted for. On occasion, panel momentum may overcome wave influences therefore a limiting mechanism may be needed to constrain the lever arm displacement to confine panel movements to within operating parameters. Limiting devices with shock absorbing capability may also avoid damage to the pump and related components.

As shown from the examples, small differences in the depth of operation affects the performance of the device therefore, some means must be implemented to retain the panel to the region of operation. Winter season wavelengths are in the neighborhood of 400+ feet with corresponding operating depths in the 200 feet range. These depths are 3 to 4 times the operating depth (of 64 feet) used in the examples. At these depths, it may be too difficult to implement any feasible mechanical means to retain the panel in the design region therefore, it may be necessary to apply the device in several strategic locations to exploit year-long seasonal variations. Design life of the device should also be considered to account for the rise in water level each year throughout the lifespan of the device, which may be significant.

By default, the panel height was constrained to fall within the operational parameter of one-half the design wavelength. The panel height may also be subject to other considerations such as safety depth for larger fully laden ships, shifting wave conditions, and larger water level fluctuations. The panel width and lever arm ratio will depend mainly on the pressures generated by the design wave and influential factors such as other devices operating in close proximity, and on moments placed on the lever arm.

Besides the panel, and pump designs, the overall design logistics is also dictated by the bathymetry at the location of interest, and current flows. The permeate and concentrate pipe diameters mainly depends on the systems capacity, flow rates, length of run, and frictional losses. In estimating pipe lengths, measurements may be acquired from contour maps. For example, from the Island of Oahu, map #19357, (Published at Washington, D.C.), at a depth of 64 feet, it can be shown that the areas of interests for locating this device falls within approximately 1,000 yards from the South Shores of Oahu. In addition, seafloor structures and bottom currents also influence pipe layout. If strong bottom current conditions prevail then, pipe armoring, or burying options may need to be considered. These are a few of the general design concerns, other design factors and influences are discussed later in the appropriate sections.

Figure 1C:
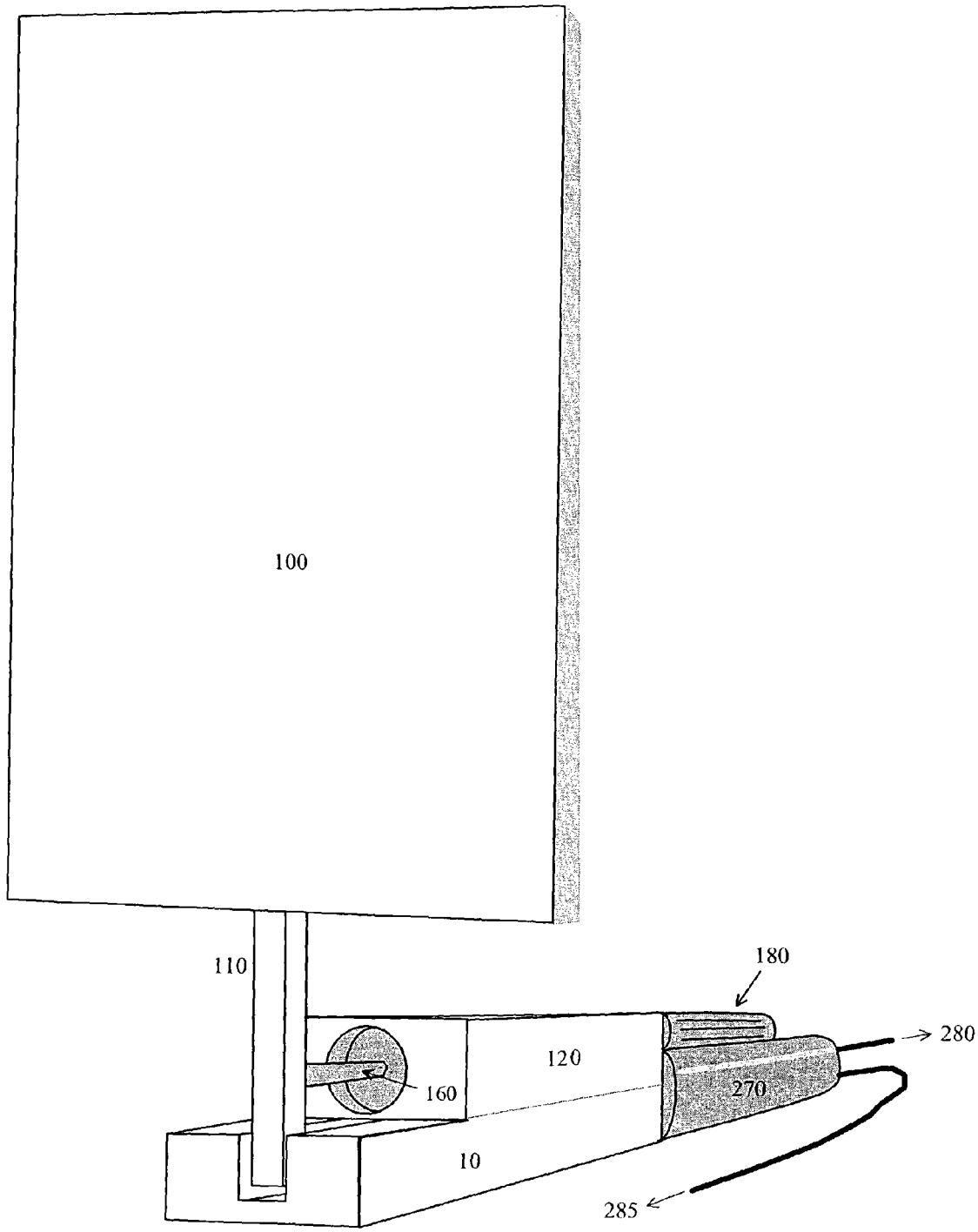
FIG. 1c is a perspective drawing showing one embodiment of the wave energy conversion device combined with a desalination unit.

The wave-energy conversion device may be usefully applied for desalination of water in a combined system, as illustrated in FIG. 1c. The desalination system consist of a stable platform 10 secured to the seabed, a lever arm 110 having a proximal end pivotable mounted to the platform 10 (or the pump body), and a distal end extending in a vertical direction toward the sea surface, a wave-energy absorbing panel 100 coupled to the distal end of the lever arm 110 to capture the impulse wave energy, and a pump 120 (or generator, or any other energy conversion device) which has a connecting rod 160 with one end coupled to the lever arm for converting the mechanical energy of wave motion into useful pump output such as for desalination of water (to be described in greater detail below). The panel 100 is dimensioned and positioned to have a major part of its wave-energy absorbing surface within the depth of L/2 from the sea surface (L is the average wavelength). In this embodiment, intake feedwater is received through an inlet filter 180 into a membrane-type (reverse osmosis) desalination unit 270 which is pressurized by the fluid output from the pump 120. The desalination unit 270 outputs permeate 280, and concentrate 285 which are then conducted in a pipe or cable to shore. The desalination unit 270 is positioned in alignment with the pump 120 in a downstream direction of expected wave motion and is dimensioned to present no greater surface area profile to wave motion than the pump in order to minimize impulse impacts on the system.

The platform 10 is constructed so that it can be fixedly secured to the seabed using appropriate foundation structures 20. For operational depths less than L/2 and or small current flow, a low profile platform is desirable to minimize wave motion influence. Depending on the seafloor soils, the inlet filters may be integrated into the foundation structures. For example, certain types of sands having good (or adequate) filtering properties and are also able to provide sufficient friction and or bearing capacity for foundational support. The platform may also be made adjustable to accommodate fluctuations in water level. This may be accomplished by the raising or lowering of the platform to coincide with the rising or falling water levels. In cases where consistent cyclic motions of water levels are known such as tides, a systematic timing device may be implemented to automatically raise and lower the platform to account for changes in the water level. Another factor, that must be accounted for are changes in wave direction. Although wave (wind) patterns tend to be consistent, in certain locations waves may traverse from different directions on a regular basis, or the predominant waves may contain other wave profiles generated by local winds. In this case the platform may be mounted on a base to allow it to rotate in order to align the panel with the prevailing wave energy flux. This fine-tuning of the system increases productivity and also prevents unnecessary torque distribution on the panel and lever arm. The device is also not limited to a stationary position on the seabed, as the platform may be mounted onto a submersible that can be raised and lowered into position for repair work, maintenance, or for relocation. Relocating the device may be useful when considering changing wave patterns due to temporary or permanent global climatic conditions. For example, if a particular area experiences seasonal changes, then the device may be relocated temporarily to a more favorable location for the duration of the period. When considering this option, suitable mounting pads with locking mechanisms can be used to secure the submersible removably on the seabed.

The lever arm 110 is dimensioned consistent with the expected waveform and for optimal energy conversion. The primary function of the lever arm is to provide the mechanical advantage needed to produce the high working pressures to drive the reverse osmosis process as well as providing stiffness to the panel. Another benefit inherent to this design is the assurance that working pressures can still be produced even with smaller-than-expected wave profiles. The relative proportion of the length of the moment arm (from its pivot mounting to the center of percussion of the work surface of the panel), and the length to its coupling to the connecting rod, is selected to optimize the amount of leverage desired for pressurizing the output from the expected design wave profile.

Although important, the length of the lever arm is not a substitute for waves producing large impulse forces. For example, this device may not produce the required driving forces with low velocity waves and longer lever arms. Also, depending on wave profiles and characteristics, lever arms having lengths longer than L/2 may not oscillate in accordance with wave particle motions. Appropriate design considerations and specifications will depend largely upon local wave conditions and bathymetry at the location of interest. A balance between panel area and lever arm length must be established to accommodate the design wave characteristics.

Depending on the wavelength and water depth, the lever arm may function more as a connection between the panel and the pump rather than providing a mechanical advantage. For example, the device may also be mounted on steep coastlines where the full wave capacities are delivered to wave-cut cliff walls. Bathymetry in these areas tend to be deep and ocean waves often shoal with little frictional losses. In this case, the panel itself may serve as the moment arm. In a similar application where the device is placed further from the coastline, reflection problems may be a factor. In wave theory the end boundary conditions were assumed to be infinite however, since these applications are situated close to shoreline boundaries, the operational design of the device may not guarantee panel oscillation. Therefore some means to restore the panel to its initial position may be required.

Some attempts have been made to employ wave reflections to obtain resonance conditions. In some cases, it may be possible to exploit natural or artificial conditions to implement such techniques. However, fixed boundary conditions and inconsistent wave profiles may be unavoidable and may prove this solution to be unfeasible. A simpler solution would be to absorb as much of the energy through the device to minimize wave reflections.

The lever arm may also be configured to allow the panel to be adjusted at the desired operational depth within the region of L/2, to account for changing conditions such as wave setup and tides. In some cases, adjusting the mounting of the panel on the lever arm may be preferred over adjusting its position by an adjustable platform. The adjustment of the lever arm can be accomplished in many ways, for example, by telescopic or sliding arm systems. One self-adapting method that can be employed would be to use buoyant forces to slide the arm up and down to maintain a desired depth of operation. To implement this method, an upper projecting part of the panel or a slide member may be made buoyant such that the work surface of the panel is maintained at the predetermined submerged depth. For this purpose, the lever arm and panel may be constructed such that the total density is slightly less than the seawater. A locking mechanism can then be activated whenever the lever arm exceeds a window (i.e., a few degrees plus or minus from the center position). Alternatively, a timed periodic adjustment device may be used to raise and lower the lever arm to accommodate changes in the water levels.

Also for device efficiency, the lever arm may serve as a mounting structure for an adjustment mechanism for the connecting rod to vary the lever arm's mechanical advantage with wave variations. For example, the connecting rod mounting point on the lever arm may be a sled that is constructed to slide up and down the lever arm within a given range of adjustment. The pump 120 and a guide for the connecting rod can be mounted on a tilting platform with a pivotable end located towards the pump side in the horizontal plane and parallel to the longitudinal axis of the lever arm pivot pin. The tilting platform should be able to rotate to some degree while retaining the geometry between the lever arm and the pump bore. In operation, as the tilting platform is rotated, the connecting rod is maneuvered up or down by the guide, and the sliding pivot on the lever arm follows the adjustments dictated by the movements of the connecting rod.

The lever arm design also lends intrinsic benefits to the overall performance of the device by dictating the strategic placement of components. In essence, the energy converting devices and associated systems at the base of the device adds mass (reduced) and provides stability to the structure. The location of the energy converting devices and systems are also in an area where the disturbance to the flow field is minimal. In addition, this configuration allows the connecting rod to be set at a lower position relative to the device, thereby reducing the reciprocating masses.

Figure 2:
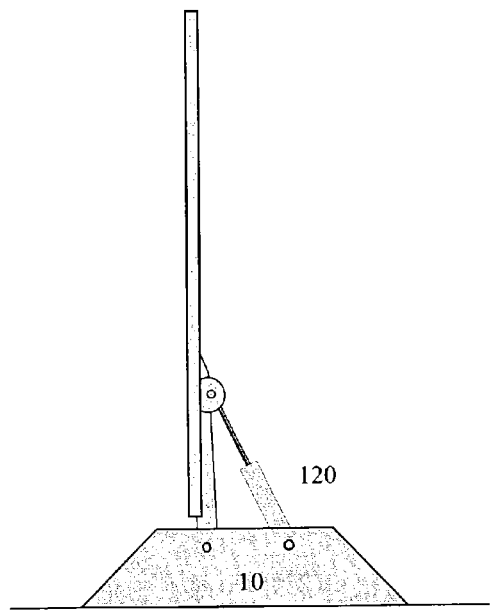
FIGS. 2, 3, 4, and 5 show variations in the configuration of leveraged pumping systems using improved lever arm designs.
Figure 3:
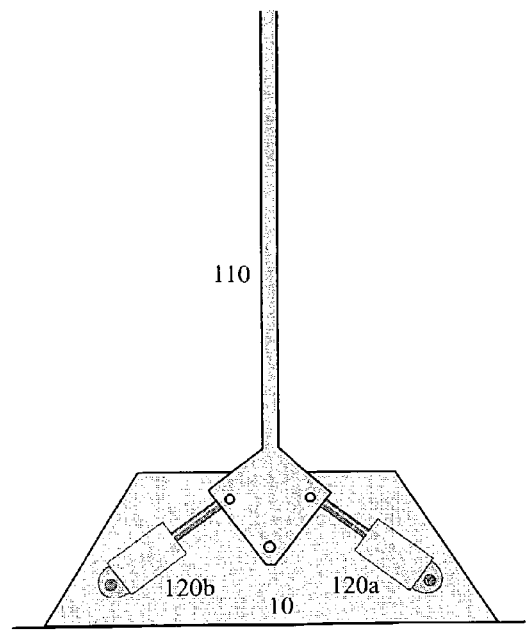

The lever arm may be configured in different ways for different structural effects. In FIG. 2, the panel 100 is mounted to a lever arm 110 with a connecting rod 160 telescoped in a pump 120 and extending at a high angle substantially vertically to a distal connecting point 165 at the back of the panel. In FIG. 3, the proximal end of the lever arm 110 has a pivotable base plate with opposing connecting rod ends 160*a*, 160*b*, and coupled to these distal ends are a pair of opposing pumps 120*a*, 120*b*.

Figure 4:
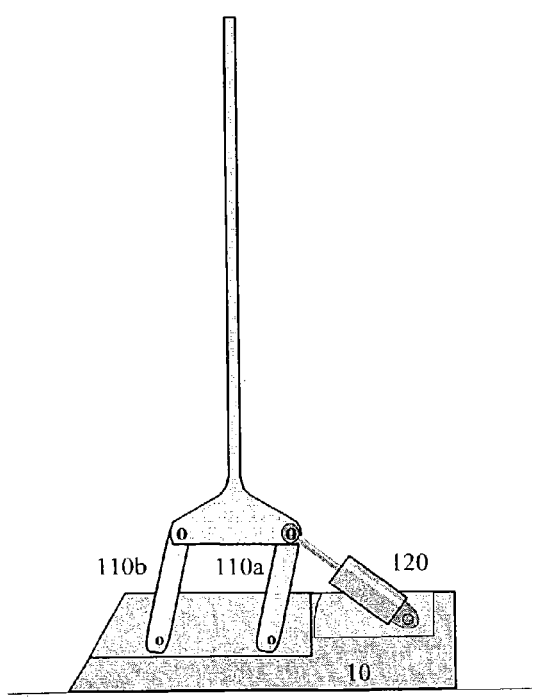

The mechanical action of the lever arm may not limit the panel to a fixed rotational path of motion. The lever arm and panel may be arranged to oscillate about different paths of rotation. An example is shown in FIG. 4, where the working surface area of the panel has a fixed orientation to the propagating energy. Here, a reciprocating cradle is formed with a T-configuration at the base of the lever arm connected to shorter rectangular shaped lever arms 110*a*, 110*b* (shown in cross-section) to which one of the connections is coupled to a pump 120. For a dual reciprocating action, both lever arm connections 110*a* and 110*b* are utilized, coupled to pumps 120*a* and 120*b* (figure not shown).

Figure 5:
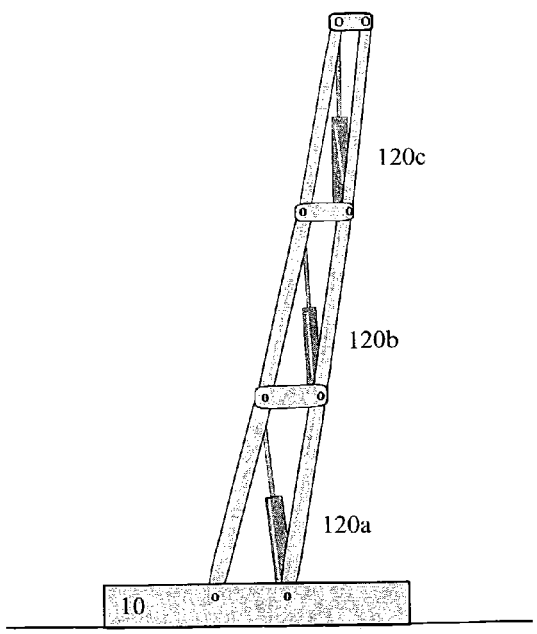

In FIG. 5, the lever arms are connected together to form a reciprocating truss-type structure which drives multiple stages of pumps 120*a*, 120*b*, 120*c*. By modifying the truss members, it is possible to construct a variety of different types of configurations as well as panel profiles by altering the lengths and pivot points of individual truss members. Other mechanical systems may be devised to provide leverage while maintaining the panel in a fixed or adjustably varied orientation with respect to the wave front. These truss-type structures also offer a little more stability and increased durability.

As previously discussed, waves may not traverse in the same direction. On occasion, wind waves from one or more directions may superimpose prevailing waves in which case, several lever arms may be needed to account for uneven torque distributions on the panel. In areas where waves are frequently superimposed, oscillation may not be guaranteed and it may be necessary to slightly modify the device. For example, the arrangement is such that a shorter arm is used to support the connecting rod pin at the upper end and coinciding with the lever arm at the lower pivot connection and the pump may be spring loaded to restore priming. In operation, the panel and lever arm are free to oscillate within a window plus or minus a few degrees about the vertical position. Upon constructive superposition (or there about) of the waves, the lever arm engages the shorter support arm thereby applying force to the pump. In this situation, actuation of the pump is dependent on the phase between the waves.

The panel element 100 is designed to maximize the performance of the device. Besides having a fixed size and shape, the panel may instead be constructed so as to alter its dimensions. Many schemes can be implemented to accomplish this task such as by using structures for rotating, folding/unfolding, rolling/unrolling, and sliding. Various energy capturing designs and methods can be used in which the panel size can be regulated. This feature can also prove useful when bringing up or closing down the system such as for installations, repairs, and maintenance operations. For example, the panel element may be constructed from multiple vertical or horizontal panels where the individual panels can be rotated about their longitudinal axis in order to project the desired working area. These individual panels need not be the same dimensions. For example, in a vertical panel orientation, the panels may be of larger dimensions in the center and reduced in width and/or cross-section in each successive panel as they extend toward the edges. This scheme may be useful when attempting to account for drag forces at the edges or redirecting flow when combining several devices in close proximity.

The panel may also be of a fan design, to fold and unfold sections. This design may incorporate multiple pivoting panel sections mounted on a cross-member attached to the lever arm. Deployment methods of the panels may be done by various methods such as motors, hydraulics, and wave-action actuated. Rolling and unrolling panel designs are also possible to incorporate such as those found on roll-up doors and the like. Sliding panel designs may also be implemented. For example, in a vertical panel orientation the lever arm can support tracks at the top and bottom. A main panel at the center may conceal two or more smaller panels that slide out to either end of the tracks to increase panel dimensions.

In employing these panel configurations, sufficient rigidity of the structure must be maintained to handle the wave forces. If the panel is too flexible (as in a "sail"), development time (the time it takes to develop full sail condition) must be coordinated with the water particle motion for the various changing waveforms. Flexibility at full sail may also cause unnecessary jerk forces to the structure and associated mechanisms of the device. Although the panels may be flexible to some degree, it should maintain form such that energy transfer results in direct energy translation and conversion. A small exception concerns the edges of the panels where some leeway in flexibility may be allowed for flow-field, drag, and turbulence considerations.

Since the efficiency of the device relies on the performance of the panel, it should be noted at this point that biological growths might be a factor in some areas. In anticipation to biological growth on the wave absorbing structures, added drag forces may be accounted for in the panel and lever arm design. It may be necessary in these cases to account for the added drag in the panel design. In instances where severe growth accumulations do not support panel efficiency then, growth inhibitor coatings can be applied to the appropriate components.

Figure 6:
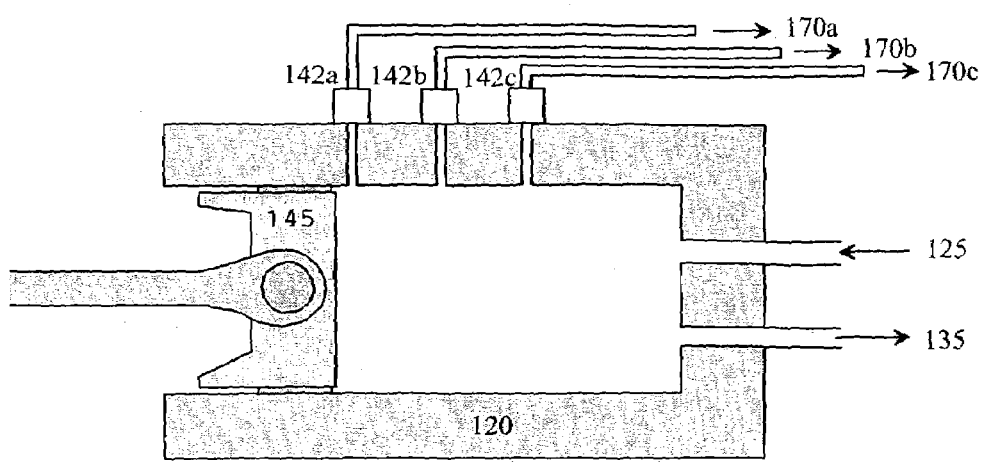
FIG. 6 shows a variable volume pump implemented in conjunction with the wave energy conversion system.

The pump 120 is selected to provide a high-pressure output sufficient for the intended work (here desalination), and is preferably of the positive-displacement piston type, although other types such as a plunger, or multi-staging driver can also be used. A variety of specialized pumps can be used for this application. For example, a variable capacity pump is shown in FIG. 6 having a piston head 145, inlet 125, outlet 135, and radially positioned pipes (or ports) 170a, 170b, 170c along the sides of the pump bore which are controlled by respective valves 142a, 142b, 142c. The volume of the pump can then be regulated by the opening or closing of the solenoid valves. To activate the valves, a pressure transducer can be used to detect the pressure of an oncoming wave, a microprocessor receives the transmitted signals, and the appropriate valves are opened (or closed) to achieve full pumping action in accordance with the wave energy. This system can also be configured to use sliding gate valves (where the ports on the pump bore are covered or uncovered by the sliding gate valve), or one-way valves (such as reed valves that can also be actuated mechanically). A pitot tube may also be used to sense the pressures generated by the waves and the pressure signal can then be mechanically interpreted to either lock or unlock the valves to set the pump(s). Another option for specific pressure requirements is to use pressure regulators instead of solenoid valves, which in operation will produce discrete sequential pressures. For a simple, low-pressure flow output, the low-pressure port merely requires a one-way valve for operation.

Figure 7:
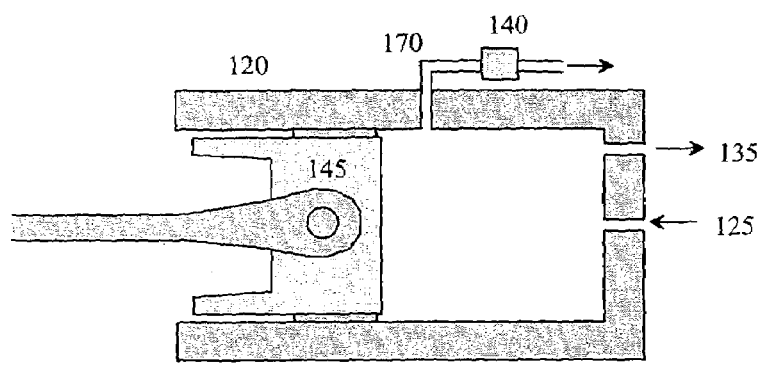
FIGS. 7 and 7a show a cross-sectional views of an embodiment of a pump designed to provide high and low pressures.

Another type of pump that can be used to reverse flush the inlet filter is shown in FIG. 7. The design is similar to the variable volume pump, but for simpler and specific applications, the staged solenoid valves (142) may be replaced by a one-way valve 140, such as a pressure regulated valve, one-way valve, or simple reed valve as discussed above. By regulating the pressures inside the pump, volume variability can also be achieved. The pump body is modified to release low pressure through port 170, past the one-way valve 140 where it will connect to the inlet filter 180. The output pressurized fluid can also be used to actuate other devices as discussed, such as those used for adjusting and regulating mechanisms for the platform, lever arm, and the various panel designs. Another option is to use the pressure to generate electrical energy to operate these other devices.

Figure 7A:
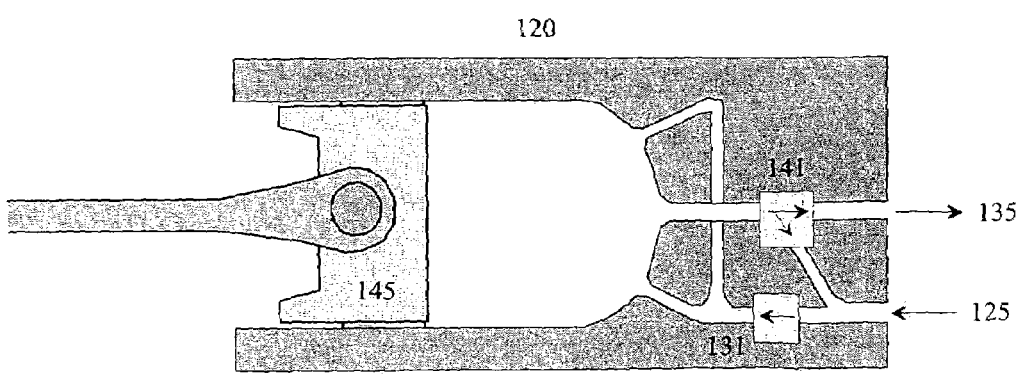

Multiple pumps may also be implemented having either the same displacements or may incorporate several different sizes and displacements. As with the specialized pumps described above, the design is similar except that the solenoid valves are attached to an outlet port near or at the bottom end of each pump as a means to select or deselect actuation. An alternate solution is to use the pumping cycle for low pressure reverse flushing and FIG. 7a shows a pump design to accomplish this objective. For example, in operation, the switching valve 141 is set to direct fluid flow to the pump outlet 135. When this pump has been deselected for operation, then the switching valve 131 is switched to a closed position while switching valve 141 is set to redirect flow to the pump inlet 125. Similar methods as discussed earlier may also be used to select pump activity using pressure sensors and other mechanical devices to maximize performance based upon the information of the incoming waves to select pump activities.

At this point, it should be mentioned that pump flow characteristics may also affect the performance of the device. Due to the nature of operation, as pump capacity increases limitations may be reached due to the inertia of the moving fluid therefore, the transport of fluid in and out of the pump should be done as efficiently as possible. To maximize pump efficiency, FIG. 7a also shows some improvements to enhance pump flows for a piston-type pump. For example, design of the pumps interior chamber including the shape, and suitable locations of the inlet and outlet ports may help to reduce friction and turbulence. Flow characteristics may also be improved by enlarging the radius of the inlet and outlet ports in the pump chamber, and lining of the fluid passages to reduce friction.

Torque-multiplying pumping systems may also be applied. For example, there are mechanical systems that can be driven from the pivot point of the lever arm such as, a worm gear that can be used to turn the piston in and out of the pump bore, a pinion gear with a rack attached to the piston, or a cam to actuate the pump.

Figure 8:
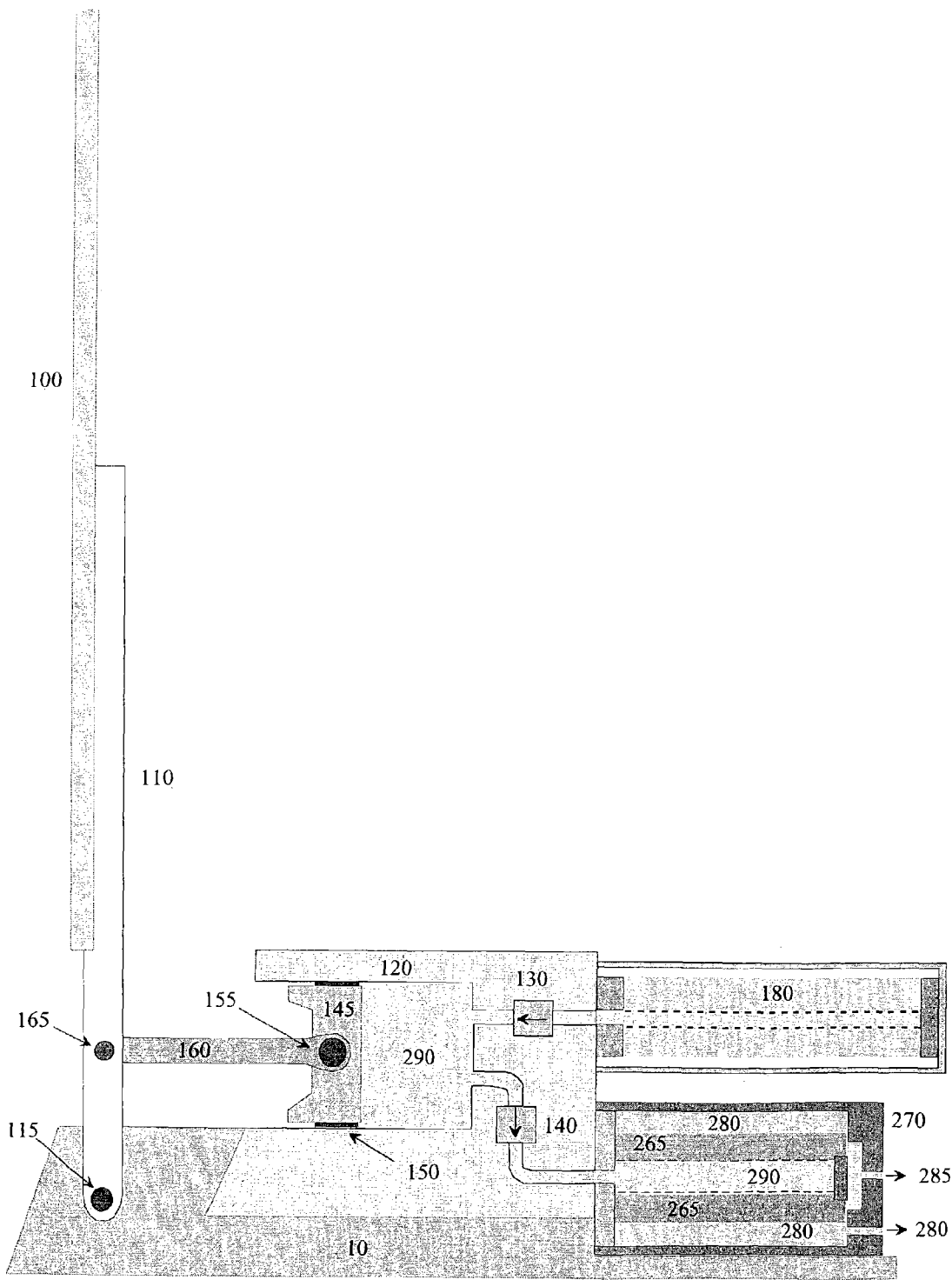
FIG. 8 shows a cross-sectional view of one embodiment of a wave energy conversion device for desalinating water using reverse osmosis membranes.

The operation of a simple desalinating device will now be described with reference to FIG. 8. Wave energy to do work is gained by intercepting the wave action via the panel 100. The cycle begins when the force of the incoming wave exerts pressure on the panel 100 supported on the lever arm 110. The short burst of wave energy is transmitted to the panel and is multiplied by the leverage system provided by the lever arm 110 coupled at its proximal end 115 to the platform structure 10 and to connecting rod 160 at connection point 165. The resultant force is then transferred via connecting rod 160 to the pump 120 where the pressurized output fluid is ported through one-way valve 140 to the outlet line 135 to the reverse osmosis filter unit 270. The feedwater 290 is then separated through the reverse osmosis membrane 265 to produce permeate 280 and concentrate 285. On the return cycle, feedwater 290 is taken in through the filter 180 past a one-way valve 130 and into the pump 120.

A pressure-operated system uses an input of pressurized fluid into a housing to increase the pressure of a fluid volume behind a filter membrane in order to force transfer of substantially salt-free water to the other side of the membrane. Configurations for the membrane and housing are available in many different sizes and types depending on applications. Present reverse osmosis technology for desalination is well known with many companies worldwide supplying products ranging from, off-the-shelf units to custom engineered systems. One company for example, Raindance Water Systems Inc. (USA) advertises desalination units for residential, commercial, and industrial applications with capacities ranging from 150 gpd to 1 mgd. The current Thin Film Composite (TFC) membranes are capable of desalinating seawater with driving pressures as low as 800 psi. However, permeate production will vary according to, among other things, rejection characteristics of the membrane, turbidity, pH, and temperature of the feedwater.

In ocean water applications, the surface zone is the least dense water. For tropical and temperate areas the temperature of the surface zone ranges between 60° F. to 78° F. and extends from the surface to a depth of about 500 feet. The temperature and density conditions are the best the ocean has to offer and are within the operating limits of the membranes and the depth is well within the operational parameters of the device. For thermocline conditions, the lower temperatures may present problems and recovery in this region may be enhanced by raising the feedwater temperatures. For example, the feedwater may be ducted through internal tubing around the pump cylinder for insulation and heat exchange, or heating elements may be implemented powered by pump pressure. Another ocean feature to consider is upwelling around coastal areas. Under these conditions, the inlet filters must be placed appropriately to reduce the intake of suspended solids (nutrients). The inlet filter may also be substituted with certain seafloor structures as a means to filter the seawater. Current research is also being done on using specific seabed elements as pre-filters to mitigate biofouling of the reverse osmosis membranes. Feedwater filtering may also be accomplished through sand filtration. Although the reverse osmosis filter is shown illustratively in FIG. 1c, and schematically in FIG. 8 for a simple version of the device, it should be understood that the filter(s) are located according to effectiveness, and replacement and maintenance considerations.

Figure 9:
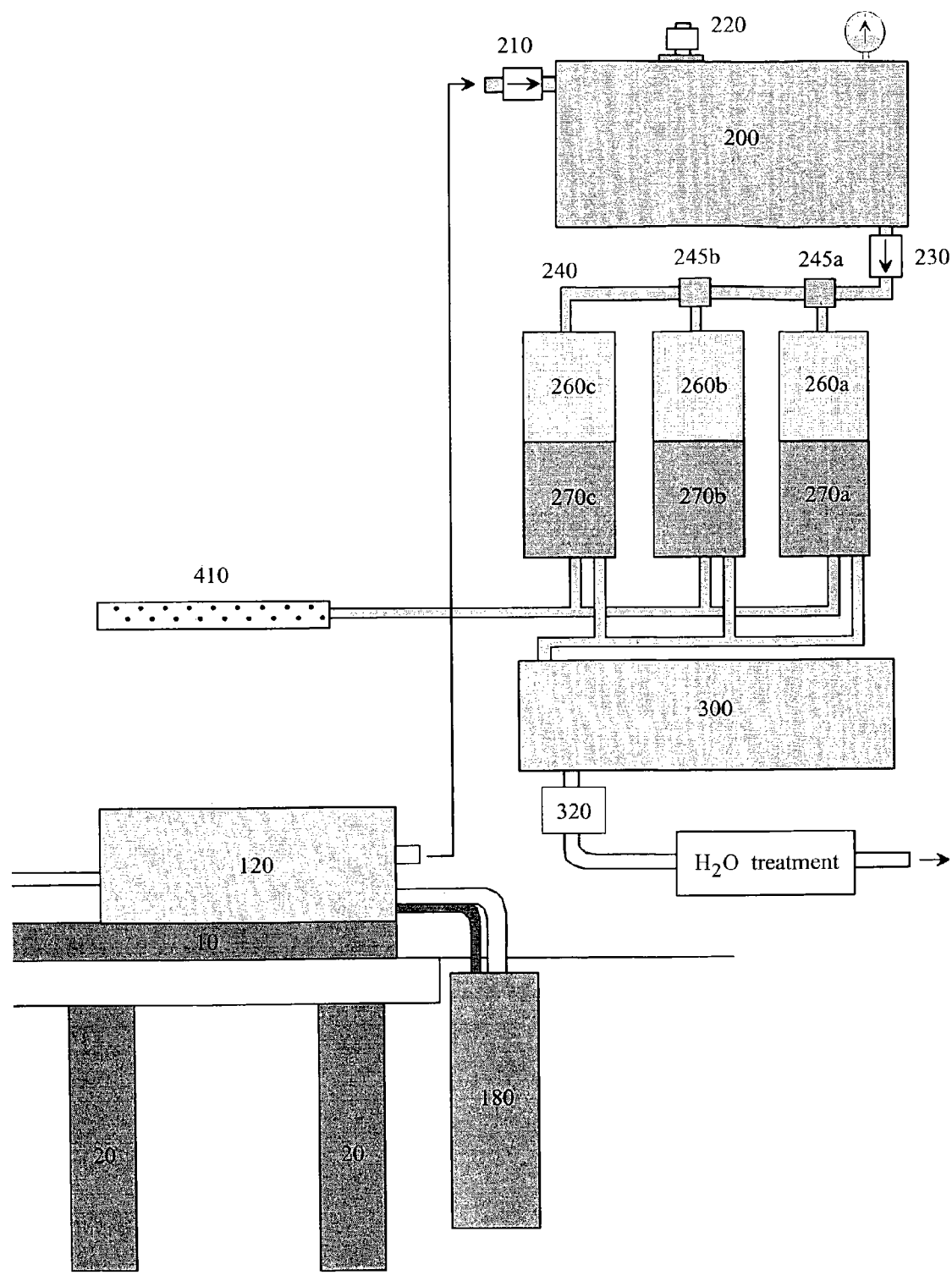
FIG. 9 shows a layout for a commercial or industrial desalination system.

A more elaborate system for commercial or industrial desalination volumes is illustrated in FIG. 9. The pump is shown mounted on platform 10 which is supported on the seabed on foundation structures 20. Intake feedwater is drawn into the inlet filter 180 and into the pump 120. Wave action is used to drive the piston 145 to pressurize the working output fluid which passes out of the pump outlet 135 and through a one-way valve 140 into a reservoir 200 where the pressure pulses are dampened and flow is stabilized through the system. A relief valve 220 is provided to release pressures beyond systems capability, or may be replaced with a pressure regulator where the excess pressures may be ported for other uses. Pressurized fluid from the reservoir 200 is released through the one-way valve 202 into distribution manifold 240 to several multi-staged units comprising of pre-filters 260 and reverse osmosis filters 270. Depending on the pressures harnessed by the energy absorbers, the system is able to regulate the online use of several filtering units (as shown in FIG. 9, with three filtering units). The pressure regulators 245 are set according to feedwater conditions and desired permeate quality. In operation, pressures above the preset condition of regulator 245a allows feedwater into the first filtering unit with excess pressures (if any) being directed to the second filtering unit, and pressures in excess of regulator 245b are directed to the third filtering unit. The system should be designed such that all excess pressures are utilized through the filtering system. An alternate design is to install a pressure regulator 245 preceding the one-way valve 230 and eliminate regulators 245a and 245b. With this system, all filtering units are utilized concurrently. The permeate 280 from the membrane process is then directed to storage tank 300 and the concentrate 285 may either be sent to an outfall or collected for further mining. Storage tank capacity will depend on permeate production and pumping frequency. Permeate transport is accomplished via transfer pump 320. The permeate may also undergo further treatment (for example chlorination) prior to integration into the water supply lines. Power to the transfer pump(s) may be provided by means of excess pressures or electricity as previously discussed or may be a land-based pump using conventional electrical power. A rubber dam or bladder may also be used in lieu of storage tank 300 that can be anchored in sheltered waters such as harbors or bays.

The pressures generated by the pump(s) are used to supply the driving forces needed for the reverse osmosis process as well as to operate other system functions. For example, the single stroke pumps described earlier (and shown in FIGS. 6 and 7) can be designed to provide multiple pressure outputs for other functions, such as pump related activities, i.e., reverse flushing of the inlet filter(s), and supplying power to other devices as discussed earlier. Multiple pumps employing a variety of different configurations may also be used. The system is designed to maximize the available pumping capacity for a variety of wave profiles, therefore the capacities of the pumps may not be symmetrical for this configuration since the output is regulated by wave pressures. To maximize wave pressures for a given device performance, a selected set of pumps may be activated for full pump stroke. Therefore, for the same stroke, a wave generating large panel pressures will activate a larger pumping capacity as opposed to a wave producing less panel pressures and activating a smaller pumping capacity. A two-pump configuration can also be implemented to exploit the forward and backward oscillations of the wave motion, as shown in FIG. 5. For example, one of the pumps can be dedicated to compressing the seawater on the forward stroke and on the return stoke, the second pump can be used to flush the inlet filter(s) or may be used as a means for powering other devices.

A related application of this device deals with the desalination of brackish waters. Areas where rainwater catchment systems and storm drain infrastructures have not been or are partially developed, it may be desirable to recover water from surface runoff. In operation, the device is placed in the vicinity of surface runoff discharging into a body of water such as at the mouth of rivers and certain shoreline areas. The runoff or brackish water is drawn into the system via intake filter(s) that are either floating on the surface or slightly submerged. The pump operated through wave power then provides the required osmotic pressures for desalination. In this application, the pre-filters and the reverse osmosis membranes will have prolonged usage.

Figure 10:
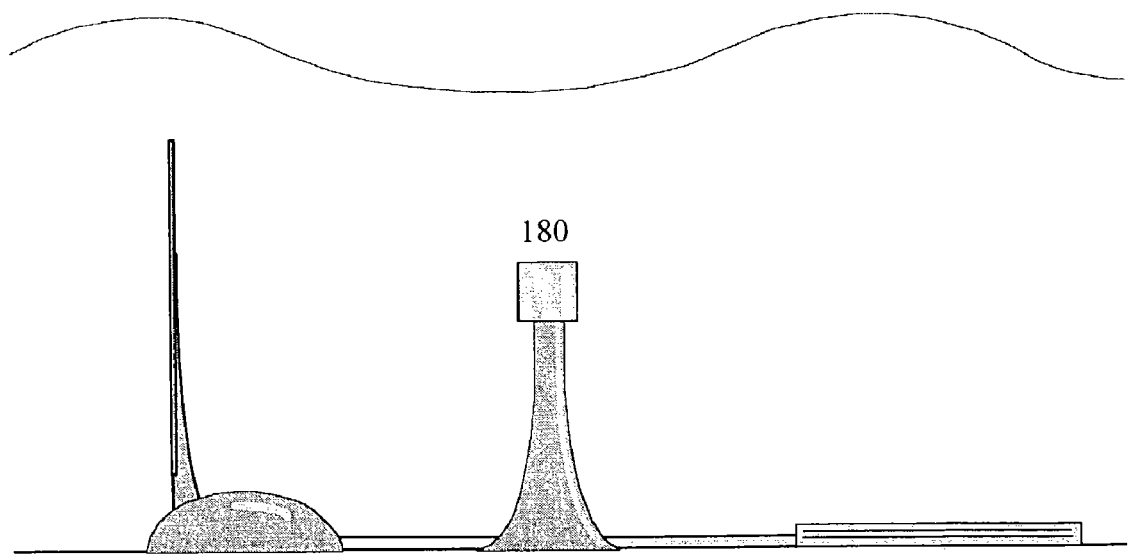
FIG. 10 shows an embodiment of the device employing an elevated filter.

Another embodiment shown in FIG. 10 has an intake filter that may be floated on the surface or suspended in the water body. This can be used to filter floating debris, suspended solids, chemicals, or other undesired constituents from estuaries, lakes, and ponds. The filtering system will depend on the nature of the elements to be filtered out from the water. At the pump outlet, the filtered water may be subjected to further treatment or may just be released back into the water body. In addition, aeration can be provided to enhance BOD levels of the water. Air may also be pumped into the system through the floating filter and injected into diffusers at the pump outlet to aerate the filtered water.

Figure 11:
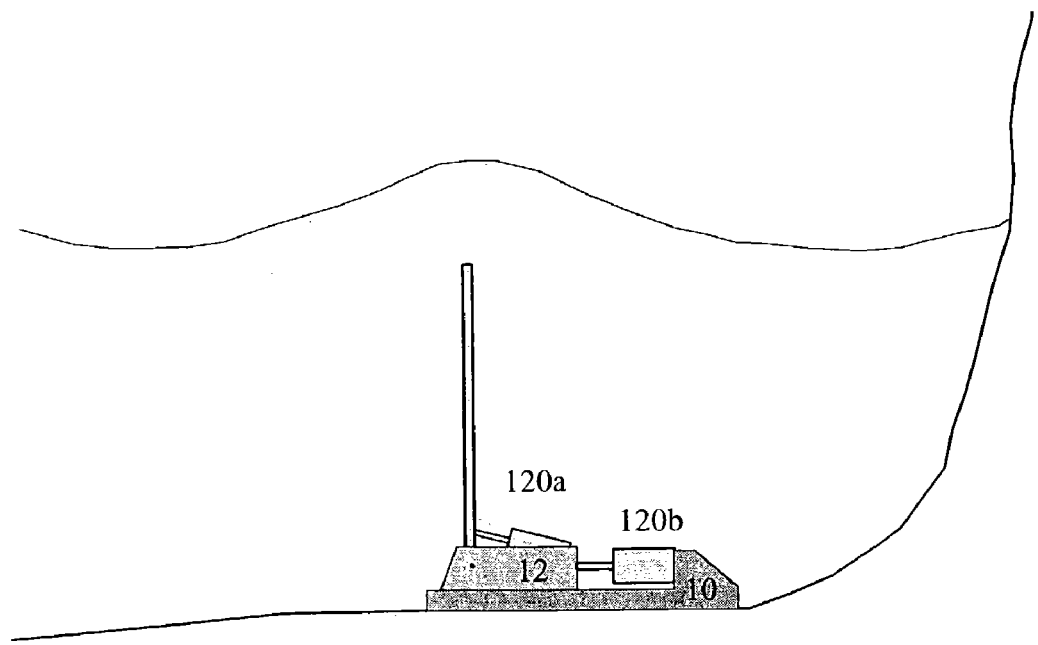
FIG. 11 shows another embodiment of the device employing a slide and double pump.

For depths less than half the wavelength, the maximum energy to the panel may be obtained by extending the panel toward the pivot point to absorb as much wave energy as possible. Although the device is primarily intended to extract subsurface energy, it is not limited to subsurface operations and in this case the panel may be extended into the wave profile to absorb the full wave energy. Other design modifications to the device can be made to absorb energy at the base of the device. For example, as shown in FIG. 11, a sliding platform 12 mounting a panel on a lever arm and pump 120a is arranged to slide on platform 10. A second pump 120b is attached to the sliding platform 12 at one end and to the fixed platform 10 at the other. As the panel and the sliding platform move under wave pressure, the energy is converted from both the panel pump 120a and the slide-actuated pump 120b. The slide may be oriented uphill and gravity-operated to help restore the sliding platform and pump to its initial position. Since the waveform may be distorted behind the panel, other design modifications may be needed to restore panel motion for example, placing a spring inside the pump bore. If the device is mounted close to a terminating boundary, channeling water behind the panel may be used such that sufficient weight and drainage rate restores the panel to a receiving position for the next wave. When implementing this device under near-shore conditions other problems may be encountered. For example, in areas where shoreline currents may exist, the use of other known techniques can also be implemented to mitigate or solve some problems such as adding breakwaters, groins, channeling, and blocking. Consideration must also be given to cross-shore and long-shore currents that give rise to sediment transport.

The pressurized output of the device may also be used to produce electricity. A conventional or variable-speed electricity generator may be used for this application. The generator may be powered using the high pressures generated by the pump. For this application, the fluids are recirculated eliminating the need for filtering. Another alternative is to use a linear generator using the oscillating motion produced by the wave absorber. In this application, the connecting rod to the lever arm may be placed higher up to produce longer strokes. The height to which the connecting rod may be placed is limited to the amount of force required and the weight of the reciprocating masses. The reciprocating motion can also be leveraged near the lever arm pivot point by using another lever arm. In essence, the mechanical advantage is reversed where torque is traded for longer stokes.

The wave energy device can also be used in cogeneration systems. For example, near the ocean the device can pump cold water from the water body depths for air-chilling systems. Cooler water temperatures may be limited to local conditions and the head potentials generated by the pumps. However, in areas where upwelling conditions occur, cooler waters can be obtained in shallower regions without the involvement of considerable depth. Alternatively, temperature regulation may be accomplished by recirculating water to cooler depths, as a means for heat exchange is also possible. The device may also be used to pump air or other fluids. For example, a floating air intake may be provided on the surface of a water body. Compressed air generated from the device can then be conducted to the site of application. In this operation, the air intake filter(s) may also be located at a land-based infrastructure.

In summary, the wave energy device of the invention is configured to utilize the available wave energy for operating a high-pressure desalination system. With a panel and lever arm orientation extending vertically from the seabed to the subsurface region, the device can absorb more of the available energy flux and its oscillation is coincident with water particle motion. The device can be located at depth on the seabed away from shorelines where there is little or no influence from the seabed, and the wave energy attenuates with little or no frictional losses. The simple lever arm and panel design has few moving parts and, therefore, less energy losses through friction and inertia between components (i.e., oscillating components are able to respond quickly to the wave induced impulse forces). The compact design makes it able to withstand rigorous wave action, and provides ease of maintenance. The design conforms to wave theory and also positions the supporting and energy conversion systems at the base of the device for stability, and where interference with the waveform is minimal. Also, by the nature of its operation, any exposed connections between the moving components are not affected by biological growth.

For environmental concerns, the device has advantages in terms of productivity and working in harmony with the environment. Since this device does not consume fossil fuels, no air pollutants are produced and no air treatment is necessary. Also, the impact on native plants and wildlife is minimized. This device is also aesthetic to the environment since all or most of the device is submerged underwater, and there are no unsightly infrastructures, or hazards to ships, boats, or other marine vessels, and recreational users. The operation is quiet, with no machinery noise from industrial type operations, and little disturbance to surrounding wildlife. In keeping with the underwater surroundings, the device will be naturally camouflaged; as biological growth begins to take hold on the panels, the device will blend into the surrounding environment. In terms of economics, the device utilizes the natural elements in the environment. There is an abundant supply of seawater, the energy is free, and the process is operational 24 hours a day. With a land-based desalination plant, land costs may account for a large portion of the budget. Since part of the device is submerged, land costs can be substantially reduced, making ocean power desalination cost effective. The concentrate from the membrane process may also be mined and processed for seawater constituents for example, NaCl, $MgSO_4$ (and other mineral salts), or other elements and compounds.

The simple design and operation makes this device versatile and adaptable to almost any installation. Since this device absorbs energy from waves, areas where shoreline erosion problems exist due to aggressive waves would be suitable locations to implement this device. In areas where shorelines are not suited for public use due to poor beach and surf conditions, competition with recreational users will be a less likely problem. This device can also be used in conjunction with, or as a replacement for breakwaters in areas where the waves are excessive such as, boat harbors, docking facilities, and recreational areas. The wave energy device is also adaptable to scale a range of applications from small to large units, and as with multiple pumps, multiple devices may also be implemented to fulfill large-scale demands. The number of units to be deployed will depend on the design capacity of the device, wave characteristics, bathymetry, and demand criteria as specified. Implementation of multiple units also depends on the spacing between the panels of each unit and blocking or channeling methods may be needed to enhance operations.

A sustainable energy device to endure the effects of natural disasters is a certain benefit. An offshore and submerged device is less likely to sustain damage due to natural disasters such as hurricanes and tsunamis. It is essential that these types of devices remain operable after such events to continue to supply water and energy needs.

It is understood that many modifications and variations may be devised given the above description of the principles of the invention. It is intended that all such modifications and variations be considered as within the spirit and scope of this invention, as defined in the following claims.

The invention is claimed is:

1. A wave energy conversion device for converting wave energy from wave motion in a body of water (the sea) to a pressurized fluid output comprises:
   (a) a stable platform secured in a seabed position in the sea at a depth below the sea surface;
   (b) a lever arm having a proximal end pivotably mounted to the platform and a distal end extending upwardly from the proximal end in a vertical direction toward the sea surface such that the distal end is movable near the sea surface in a pivoting motion about the proximal end mounted to the platform below the sea surface;
   (c) a wave-energy absorbing panel coupled to the distal end of the lever arm and oriented to absorb the impulse wave energy of waves moving through the sea near the sea surface, said panel having a predefined panel surface area facing toward a given direction of expected wave motion beneath the sea surface which is impacted by the wave motion beneath the sea surface to move in oscillating motion to and fro as the lever arm is pivoted with its distal end moving pivotably about its proximal end with the ebb and flow of wave motion; and
   (d) a fluid pump having a piston rod coupled to the pivoting lever arm for applying pressure to intake fluid in the pump with the oscillating motion of the panel in order to provide a high-pressure fluid output for high-pressure uses,
   wherein the panel has substantially its entire panel surface area submerged in a sea subsurface region defined as approximately a depth of L/2 below the sea surface, where L represents the wavelength of the waves moving near the sea surface.

2. A wave energy conversion device according to claim 1, combined with a desalination unit employing the high-pressure fluid output from the pump to produce a desalinated water output.

3. A wave energy conversion device according to claim 2, wherein the desalination unit is of a type operating by reverse osmosis.

4. A wave energy conversion device according to claim 2, wherein the desalination unit is supported with the pump on the platform and is coupled to the high-pressure fluid output from the pump.

5. A wave energy conversion device according to claim 4, wherein the desalination unit is positioned in alignment with the pump in a downstream direction of wave motion and presents no greater surface area profile to wave motion than the pump.

6. A wave energy conversion device according to claim 1, wherein the panel is mounted to the lever arm and a connecting rod telescoped to the pump extends at a high angle substantially vertically to a distal connecting point to the lever arm.

7. A wave energy conversion device according to claim 1, wherein the proximal end of the lever arm is connected to a pivotable base plate which has opposing ends coupled to connecting rods of an opposing pair of pumps.

8. A wave energy conversion device according to claim 1, wherein the lever arm is connected to a reciprocating cradle coupled through a pair of connecting rods for dual reciprocating action of the pump.

9. A wave energy conversion device according to claim 1, wherein multiple lever arms supporting the panel are connected together in a reciprocating truss-type structure and coupled to multiple stages of pumps.

10. A wave energy conversion device according to claim 1, wherein the pump is a variable capacity pump having a piston head and radially positioned pipes (or ports) along the sides of its pump bore which are controlled by respective valves so that the volume of the pump can be regulated by opening or closing of the valves.

11. A wave energy conversion device according to claim 1, wherein the pump has one-way outlet valve(s) for releasing pressures inside the pump to vary the pump capacity.

12. A wave energy conversion device according to claim 1, wherein the pump has a one-way valve for controlling the intake of intake seawater through an intake line and another one-way valve for controlling the outflow of pressurized fluid through an outlet line.

13. A wave energy conversion device according to claim 1, wherein the platform is elevated above the seabed on pier structures.

14. A wave energy conversion device according to claim 1, wherein the platform is adjustable in height above the seabed.

15. A wave energy conversion device according to claim 1, wherein the high-pressure fluid output is conducted to shore for use in a commercial scale desalination plant located on the shore.

16. A wave energy conversion device according to claim 1, wherein the device is attached to a submersible structure that can be raised or lowered to and from the seabed depths and also relocated.

17. A wave energy conversion device according to claim 1, wherein the coupling of the panel to the lever arm is adjustable to adjust the position of the panel in the subsurface region (area) despite sealevel variations.

18. A wave energy conversion device according to claim 1, wherein the pump has an intake for intake seawater that is buoyant or floats on the surface of the sea.

19. A wave energy conversion device according to claim 1, wherein the panel is coupled to a first pump and supported on a sliding sled, and a second pump is coupled between the sliding sled and a fixed part of the platform.

20. A wave energy conversion device according to claim 1, wherein the high pressure uses include a use selected from the group consisting of: desalinating water; producing electricity; cogeneration systems; pumping cold water from the sea depths for air-chiller systems; recirculating water to cooler depths for heat exchange uses; pumping compressed air or other fluids.

* * * * *